Oct. 24, 1961     A. F. PITYO     3,005,900
METHOD OF AND APPARATUS FOR MAKING DIODE ELEMENTS
Filed Feb. 11, 1960
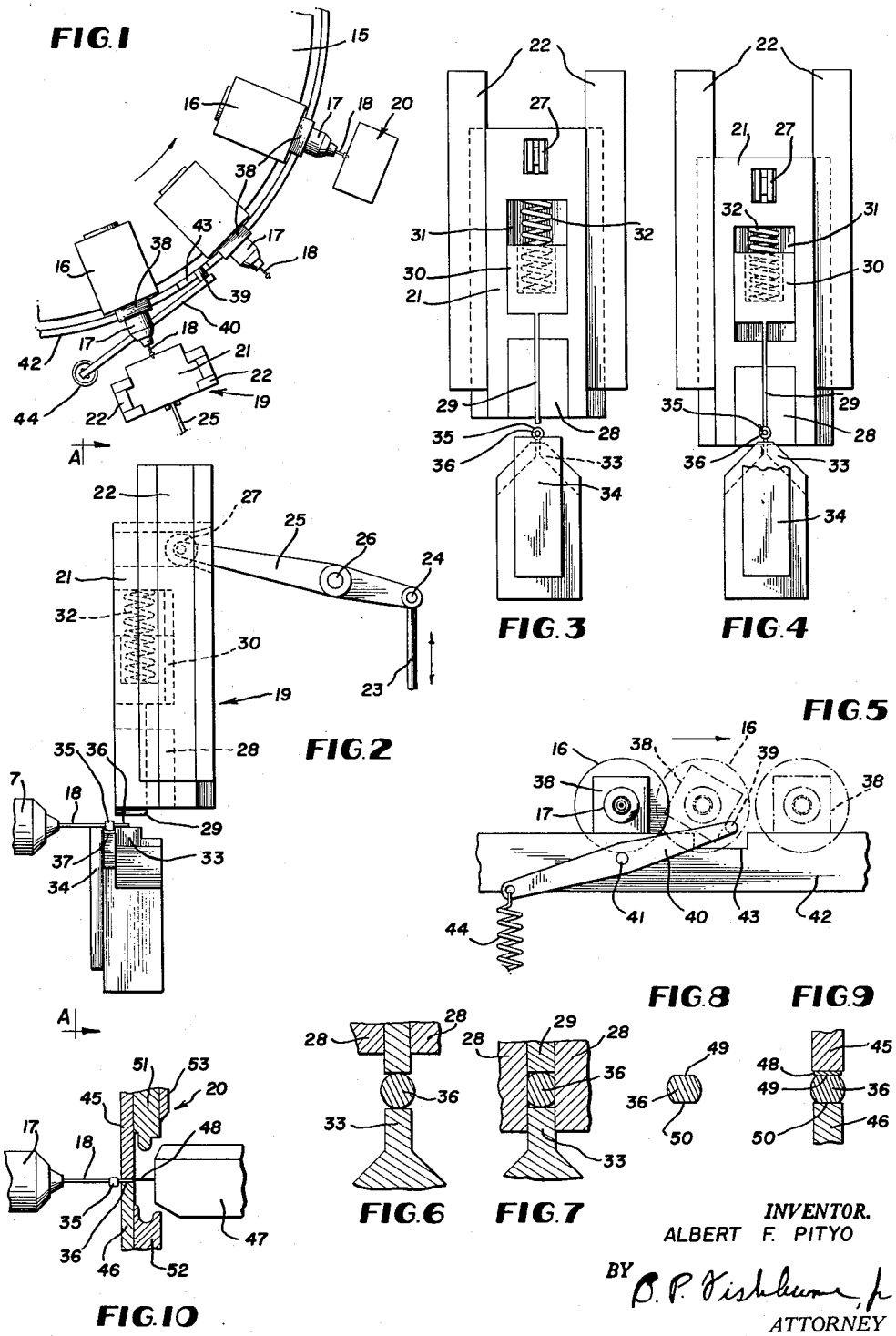
INVENTOR.
ALBERT F. PITYO

United States Patent Office 3,005,900
Patented Oct. 24, 1961

3,005,900
METHOD OF AND APPARATUS FOR MAKING DIODE ELEMENTS
Albert F. Pityo, 1384 Pompton Ave., Cedar Grove, N.J.
Filed Feb. 11, 1960, Ser. No. 8,165
7 Claims. (Cl. 219—79)

The present invention relates to a method of and apparatus for making diode elements.

More particularly, the present invention is directed to a method of and apparatus for conditioning the end portion of a lead wire of a diode element so that the cat whisker or point contact element may be effectively welded thereto in an automatic machine for making diode elements.

The present invention is an improvement upon the method and apparatus shown in my prior copending application, Serial Number 734,512, filed May 12, 1958, for Method of Making Diode Elements.

The problem of electrically welding a very fine wire such as a .0015 inch gold wire to a glass beaded dumet lead wire is extremely difficult, unless the surfaces to be welded are clean. The dumet lead wire to which the gold wire or the like is to be welded has on it a coating of borate, which is very difficult to penetrate with the welding electrodes. Additionally, the problem is made much more difficult when the glass bead on the lead wire has been sealed thereto with flame prior to the welding operation. This causes deposits of carbon and other impurities to accumulate upon the lead wire in addition to the borate coating thereon.

Attempts have been made to clean the lead wire in the region of the weld, prior to welding, by scraping, or by using hydrogen flames to clean the lead wire. These methods have not proved entirely satisfactory in practice, particularly in connection with automatic machinery for mass producing diode elements.

In my mentioned prior copending application Serial Number 734,512, scraper blades are employed to scrape or clean opposite sides of the end portion of the dumet lead, prior to electrically welding the cat whisker thereto. While this means is effective to clean the lead wire, it has been found that the scraper blades do not stand up or last long in an automatic machine.

If a hydrogen flame or the like is utilized to clean the dumet lead, this flame if strong enough to produce the necessary cleaning action is likely to effect the bond or seal of the glass bead which is spaced only about .040 inch from the end of the lead wire to which the cat whisker is electrically welded. If the hydrogen flame is such that it does not adversely effect the glass bead, then the flame will not effectively clean the dumet lead to permit efficient electrical welding.

It is therefore an object of the present invention to entirely overcome the above difficulties incident to the production of diode elements in an automatic apparatus, by providing means for shaving opposite sides of the dumet lead, prior to welding the cat whisker thereto, and in a manner to provide clean surfaces on opposite sides of the lead and without employing scraper blades or like means subject to rapid wear or deterioration in the apparatus.

Another object is to utilize in the above-mentioned operation for cleaning the dumet lead prior to welding a shaving die formed of tungsten carbide or the like, which may be utilized for long periods in the mass production of the diode elements without appreciable wear or deterioration.

Another object of the invention is to provide shaving die means for cleaning the dumet lead to close tolerance on the small length of the lead which projects forwardly of the glass bead, previously sealed thereto, and without disturbing or damaging the bead in any way during the shaving operation.

A further object is to provide novel and simplified means for indexing the previously shaved lead upon its longitudinal axis to bring the shaved faces of the lead into proper orientation with the welding means utilized to electrically weld the cat whisker to the lead.

A further object is to provide shaving and indexing means of the above-mentioned character which facilitate using the welding apparatus disclosed in my prior United States Patent 2,779,993 for electrically welding the cat whisker to the dumet lead, subsequent to the cleaning or shaving operation.

Other objects and advantages of the invention will be apparent during the course of the following description.

In the accompanying drawings forming a part of this application and in which like numerals are employed to designate like parts throughout the same, FIGURE 1 is a fragmentary plan view of a turret apparatus employed according to the invention to produce diode elements and illustrating partly diagrammatically shaving and welding stations.

FIGURE 2 is an enlarged fragmentary side elevation of the apparatus shown in FIGURE 1 at the shaving station, parts omitted.

FIGURES 3 and 4 are elevational views taken substantially on line A—A of FIGURE 2 and showing the shaving die means respectively in inactive and active positions relative to the anvil and dumet lead or work.

FIGURE 5 is a fragmentary end elevation of the apparatus adjacent to the shaving station, parts omitted, and showing the means for indexing the work upon its longitudinal axis while the turret is traveling from the shaving to the welding station.

FIGURE 6 is an enlarged fragmentary vertical section through the shaving die means during the initial operation of the same upon the lead or work.

FIGURE 7 is a similar sectional view of the shaving die means during the shaving operation.

FIGURE 8 is an enlarged cross section of the shaved dumet lead after the same has been indexed ninety degrees upon its longitudinal axis, subsequent to the shaving step and prior to welding the cat whisker to the lead.

FIGURE 9 is a fragmentary vertical section illustrating the step of electrically welding a cat whisker to the shaved lead at the welding station.

FIGURE 10 is a fragmentary vertical sectional view partly in elevation showing the means for electrically welding a fine wire to the shaved lead, prior to shaping the fine wire into the finished cat whisker.

In the drawings, wherein for the purpose of illustration is shown a preferred embodiment of the invention, the numeral 15 designates a turret or turntable similar to the turntable disclosed in my mentioned copending application Serial Number 734,512. This turntable 15 carries a number of circumferentially spaced holding devices 16, fixedly secured thereto, each such holding device embodying a rotating chuck 17 adapted to hold and rotate a dumet lead wire 18 upon its longitudinal axis at various work stations of the apparatus, as fully described in application Serial Number 734,512.

With reference to FIGURE 1, there is shown a shaving apparatus or station 19 and a welding station 20 spaced circumferentially from the shaving station, the turret 15 being adapted to be indexed circumferentially from station to station, during the practice of the method.

With continued reference to the drawings, the apparatus 19 at the shaving station comprises a cam actuated reciprocatory slide 21, operating at right angles to the longitudinal axis of the lead 18 of the adjacent holding device 16. The slide 21 operates between vertical guides 22, suitably fixedly mounted near and beyond the periphery of the turret 15. The slide 21 is reciprocated by automatic cam means, not shown, through the medium of a reciprocatory link 23, pivoted at 24 to a lever 25, in turn pivotally supported intermediate its ends, as at 26. The free end of the lever 25 is operatively connected at 27 to the slide 21, as indicated diagrammatically in the drawings.

The reciprocatory slide 21 carries at its lower end shaving blade or die inserts 28, fixedly secured thereto in spaced apart relation, as shown in FIGURES 3, 4, 6 and 7. The slide 21 also carries a central hold down element 29 between the die inserts 28 and movable lengthwise relative thereto. The hold down element includes an enlargement 30 integral therewith, slidable longitudinally within a cavity 31 of the slide 21 and urged forwardly with respect to the die inserts 28 by spring means 32, likewise carried by the slide 21.

The shaving apparatus 19 also embodies a stationary anvil 33, disposed directly below the hold down element 29 and adapted to enter between the inner opposed faces of the die inserts 28 during the shaving operation, as best shown in FIGURE 7. A wire support and locator element 34, rigid with the anvil 33, is engageable with one side of the lead 18, FIGURE 2, close to and rearwardly of the glass bead 35 carried by the lead and previously sealed thereto at a preceding work station of the apparatus, not shown. The leading end portion 36 of the dumet lead 18 is adapted to rest upon the anvil 33 at the work station 19 as clearly indicated in FIGURES 2 and 6. The glass bead 35 is at this time disposed between the elements 33 and 34 within a protective pocket 37, adapted to receive the bead, as indicated.

Means are provided to index or turn the lead 18 upon its longitudinal axis substantially ninety degrees subsequent to the shaving operation performed at the shaving station 19. This means comprises a square locator block 38, rigidly mounted upon each rotary chuck 17, for engagement by a projecting pin element 39, carried by a lever 40, pivotally mounted intermediate its ends at 41 upon a stationary support member or band 42, lying close to the periphery of the turret 15, as shown. The band 42 is provided adjacent the pin element 39 with a notch 43 adapted to receive the pin element, so that the latter may clear the locator block 38 after turning the same ninety degrees from its initial position at the shaving station 19. The end of the lever 40 remote from the pin element 39 is connected with a retractile coil spring 44, serving to maintain the pin element 39 normally in the path of travel of the locator block 38, see FIGURE 5. Any other preferred means may be employed for indexing the lead 18 ninety degrees upon its longitudinal axis while the same is moving with the turret 15 between the shaving station 19 and the cat whisker or welding station 20.

At the welding station 20, FIGURES 9 and 10, electrical welding apparatus substantially identical to the apparatus shown in my prior Patent 2,779,993 is employed for welding the cat whisker to the previously shaved end portion of the dumet lead 18. This apparatus is also broadly illustrated in my prior copending application Serial Number 734,512, previously mentioned herein. The welding apparatus comprises welding electrodes 45 and 46, between which the previously shaved end portion 36 of the dumet lead 18 projects during the welding step, FIGURES 9 and 10. Reciprocating feed jaw means 47 are provided for feeding a fine wire 48 of gold or the like into overlapping relation with one of the shaved faces 49 of the lead end portion 36. The welding electrodes 45 and 46 may now move together into opposed contacting relation with the wire or ribbon element 48 and with the other flat shaved face 50 of the lead end portion 36, FIGURE 9, and the welding circuit is energized through the electrodes 45 and 46 and through the work to weld the fine wire 48 to the dumet lead. An effective weld is produced in this manner due to the provision upon the lead 18 of the clean parallel flat faces 49 and 50, produced by the abovedescribed shaving operation. In practice, the shaving operation may remove about .002 inch of material from each side of the lead 18, which lead is approximately .020 inch in diameter. The shaved portion of the lead 18 in practice is about .040 inch measured inwardly from the free end of the lead, forwardly of its bead 35. These dimensions may be varied somewhat in practice and are not extremely critical.

At the welding station 20, subsequent to the abovedescribed welding of the fine wire 48 to the lead 18, the wire 48 is acted upon by forming die means 51 and 52 and severing means 53 to form the wire 48 into a finished cat whisker, not shown, in substantially the identical manner shown and described in my prior Patent 2,779,993.

The operation of the apparatus and the practice of the method is as follows:

Subsequent to the application of the glass bead 35 to the dumet lead 18 and other preliminary operations at preceding work stations of the apparatus, the turret 15 is indexed in the direction of the arrow, FIGURE 1, and brought to rest so that one work holder 16 is at the shaving station 19, as shown. The rotary chuck 17 is now stationary and does not rotate and the beaded lead 18 is positioned upon the anvil 33 and the support and locator element 34 beneath the slide 21 as indicated in FIGURES 2 and 3.

The lever 25 is now operated by suitable cam means to shift the slide 21 toward the anvil 33, and when this occurs, the hold down element 29 will initially engage the end portion 36 of the lead and clamp the same firmly against the anvil 33, so that the lead cannot move axially or laterally and cannot rotate. Continued movement of the slide toward the anvil causes the shaving die inserts 28 to move downwardly beyond the hold down element 29, FIGURE 7, and to shave the opposite sides of the lead end portion 36 to form the flat clean faces 49 and 50 thereon. The shaving die inserts 28 follow through and straddle the anvil 33, FIGURE 7, to effect complete shaving of the lead without any burrs and without the accumulation of shavings on the anvil or between the die inserts.

Subsequent to this, the slide 21 is retracted in the reverse direction from the anvil 33 and work and the shaving die inserts 28 and hold down element 29 move clear of the work as indicated in FIGURES 2 and 3. At this time, the lead 18 is still positioned at the shaving station 19 and the flat shaved faces 49 and 50 are disposed parallel to the path of travel of the reciprocatory slide 21 and shaving die inserts 28. The faces 49 and 50 are thus normal to the plane of the turret 15 and arranged at right angles to the plane in which the wire or ribbon element 48 is to be subsequently welded to the face 49, FIGURE 9.

After retraction of the slide 21 from the work, the turret 15 is again indexed toward the welding station 20. When so indexed, the square locator block 38 on the rotary chuck 17 engages the projecting pin element 39 of the lever 40, FIGURE 5, and this pin element indexes or turns the locator block with the lead 18 through ninety degrees on the longitudinal axis of the lead. When this is accomplished, the flat parallel shaved faces 49 and 50 are disposed at right angles to their previous positions at the shaving station, FIGURE 7, and properly oriented to the plane in which the element 48 is to be welded to the lead. The indexing of the turret 15 to the welding station 20 now continues, and the turret 15 is brought to rest at the welding station, so that the welding step can be carried out in the manner previously described.

In this connection, it is pointed out that an important feature of the invention is to index the lead 18 ninety degrees upon its longitudinal axis while the lead is moving with the turret between the shaving and welding stations.

My electrical welding apparatus shown in my prior Patent 2,779,993 and also shown in my prior copending application Serial Number 734,512 is adapted only to weld the fine wire or ribbon element to the lead in a plane at right angles to the planes of the shaved faces 49 and 50 when the latter are produced at the shaving station. It is therefore essential in connection with my complete method and apparatus for making diode elements in my mentioned prior copending application to index the lead 18 ninety degrees upon its longitudinal axis when the same is moving from the shaving station to the welding station.

Subsequent leads 18 in subsequent work holders 16 on the turret 15 are acted upon at the shaving and welding stations 19 and 20 in the same manner above described in connection with a single lead 18 and a single work holder. The method is thus practiced in a continuous manner for as long a time as desired.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. In apparatus for making diode elements, a turret adapted to be indexed between shaving and welding stations, holding means for a lead wire carried by said turret, a stationary anvil at the shaving station engageable with one side of the lead wire, a reciprocatory slide movable toward and from said anvil and including resilient hold down means engageable with the lead wire to clamp it to the anvil, shaving die elements carried by the slide on opposite sides of the hold down means and adapted to shave material from opposite sides of the lead wire at the shaving station to produce parallel clean flat faces on opposite sides of the lead wire at the shaving station, means to reciprocate said slide, means to index the lead wire ninety degrees upon its longitudinal axis while said turret is being indexed from the shaving station toward the welding station so that said clean flat faces are arranged at right angles to their initial positions at the shaving station when the lead wire reaches the welding station, means to position a cat whisker element in overlapping relation with one of said clean flat faces and the welding station, and welding electrode means at the welding station to engage the cat whisker element and one of said clean flat faces and to electrically weld the cat whisker element to the other clean flat face of the lead wire at the welding station.

2. Apparatus for making diode elements comprising movable support means for a glass beaded lead wire having an end portion to which a cat whisker element is to be welded, reciprocatory shaving die means engageable with said end portion of the lead wire to shave material from opposite sides of the same for forming clean parallel flat faces on opposite sides of the lead wire, means to rotate the lead wire substantially ninety degrees on its longitudinal axis while the lead wire is carried by said turret from the shaving station toward the welding station of the apparatus, and means to electrically weld a cat whisker element to one of said flat faces of the lead wire at the welding station while said flat faces are at right angles to their initial positions at the shaving station.

3. Apparatus for making diode elements according to claim 2, wherein said means to rotate the lead wire upon its longitudinal axis includes a locator block having a flat face on said supporting means, and an element arranged in the path of travel of the locator block when the latter is moving from the shaving station to the welding station of the apparatus.

4. In apparatus for making diode elements, a movable support adapted to travel between a shaving station and a welding station and to come to rest at said stations, holding means for a lead wire mounted upon the movable support, a stationary anvil at the shaving station engageable with one side of the lead wire, reciprocatory shaving die means at the shaving station for coaction with the anvil to shave opposite sides of the lead wire for forming opposed clean flat faces thereon, reciprocatory welding electrode means at the welding station and operating parallel to the reciprocatory shaving die means and adapted to electrically weld a cat whisker forming element to one of said clean flat faces of the lead wire and to engage the other clean flat face during welding, and means to turn the lead wire substantially ninety degrees on its longitudinal axis while the lead wire is being moved from the shaving to the welding station to thereby position said clean flat faces at right angles to their initial positions at the shaving station.

5. Apparatus for making diode elements comprising a turret adapted to be indexed between a shaving station and a welding station, rotary chuck means on the turret adapted to hold a wire lead, reciprocatory shaving die means at the shaving station operating at right angles to the longitudinal axis of the wire lead and engageable with opposite sides of the wire lead to shave such opposite sides and form clean flat faces thereon, means to operate the reciprocatory shaving die means, reciprocatory welding electrode means at the welding station and operating parallel to the line of movement of the shaving die means and adapted to electrically weld a fine metal element to one of said clean flat faces of the wire lead and to engage the other clean flat face during the welding operation, a locator element carried by said chuck means and having a trip face, and resilient means arranged in the path of travel of the locator element when the latter is moving from the shaving to the welding station and engageable with the trip face to index the wire lead upon its longitudinal axis substantially ninety degrees so that said clean flat faces at the welding station are disposed at right angles to their initial positions at the shaving station.

6. Apparatus for making diode elements according to claim 5 and wherein said resilient means comprises a pivoted lever having a part in the path of travel of the locator element intermediate the shaving and welding stations, and a spring connected with said lever to normally hold said part in the path of travel of the locator element and yielding to allow said part to disengage the trip face after indexing the wire lead.

7. In apparatus for making diode elements, means to support a beaded lead wire at a shaving station, a stationary anvil means at the shaving station engageable with one side of the lead wire forwardly of said bead and at one end of the lead wire, reciprocatory shaving die means at the shaving station working in opposition to the anvil means and coacting therewith to shave opposite sides of the lead wire adjacent said one end of the lead wire to form thereon opposed clean metal faces, means to move the support means and lead wire to a welding station, and opposed reciprocatory electrode means at the welding station engageable with said clean faces for electrically welding a fine metal element to the lead wire near said one end thereof.

References Cited in the file of this patent

UNITED STATES PATENTS

| 2,749,420 | Pityo | June 5, 1956 |
| 2,751,527 | Shower | June 19, 1956 |
| 2,779,993 | Pityo | Feb. 5, 1957 |
| 2,784,297 | Pityo | Mar. 5, 1957 |

FOREIGN PATENTS

| 576,769 | Great Britain | Apr. 17, 1946 |